United States Patent [19]

Tomisawa

[11] Patent Number: 4,641,326
[45] Date of Patent: Feb. 3, 1987

[54] COUNTER CIRCUIT OPERABLE IN SYNCHRONISM WITH FRAME OR DIGITAL DATA SIGNAL

[75] Inventor: Norio Tomisawa, Hamamatsu, Japan

[73] Assignee: Nippon Gakki Seizo Kabushiki Kaisha, Hamamatsu, Japan

[21] Appl. No.: 659,576

[22] Filed: Oct. 10, 1984

[30] Foreign Application Priority Data

Oct. 14, 1983 [JP] Japan .................... 58-190911

[51] Int. Cl.$^4$ .................................. H04L 7/00
[52] U.S. Cl. .................................. 375/108; 360/51
[58] Field of Search ............ 375/108; 360/38.1, 51; 358/314

[56] References Cited

U.S. PATENT DOCUMENTS

| | | | |
|---|---|---|---|
| 3,865,981 | 2/1975 | Welch et al. | 360/51 |
| 4,275,466 | 6/1981 | Yamamoto | 360/51 |
| 4,477,842 | 10/1984 | Kaneko | 360/38.1 |
| 4,479,230 | 10/1984 | Auzet et al. | 375/108 |

Primary Examiner—Douglas W. Olms
Assistant Examiner—Wellington Chin
Attorney, Agent, or Firm—Spensley Horn Jubas and Lubitz

[57] ABSTRACT

There is provided a counter circuit operable in synchronism with a frame of a digital data signal of a digital audio system even if a frame synchronization signal is not detected. The counter circuit comprises a detection circuit for detecting the frame synchronization signal of the digital data signal to produce a frame synchronization detection signal. A series of counters repeatedly count clock pulses reproduced from the digital data signal to produce a count signal when the count of the series of counters reaches a value corresponding to the number of channel bits includes in one (1) frame of the digital data signal. A reproduction frame sychronization signal is generated in response to the frame synchronization signal when the count of the series of counters is within a predetermined range, the reproduction frame synchronization signal resetting the counters. The reproduction frame synchronization signal is also generated in response to the count signal when the count of the series of counters is within the predetermined range and when the frame synchronization detection signal is not outputted from the frame synchronization signal detection circuit, the reproduction frame synchronization signal resetting the counters.

7 Claims, 7 Drawing Figures

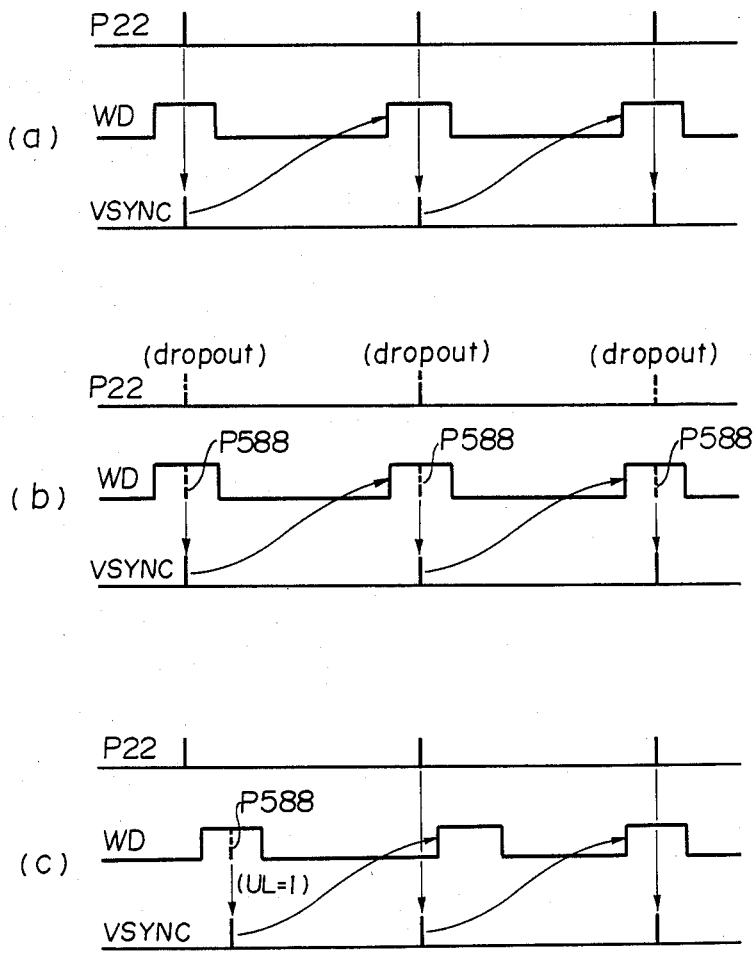
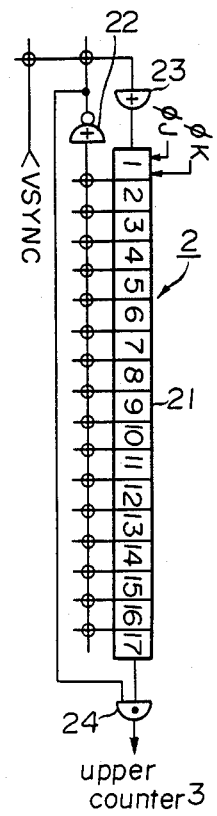
FIG. 5
FIG. 6

COUNTER CIRCUIT OPERABLE IN SYNCHRONISM WITH FRAME OR DIGITAL DATA SIGNAL

BACKGROUND OF THE INVENTION

1. Field of the Invention

This invention relates to a counter circuit operable in synchronism with a frame of a digital data signal, so that a frame synchronization of the counter circuit with the frame in the digital data signal can be properly achieved even if a frame synchronization signal of the digital data signal is not available due to a dropout or the like.

2. Prior Art

In a compact disc of the compact disc digital audio system, information is stored in the compact disc in units called frames each composed of 588 channel bits. As shown in FIG. 1, one frame is composed of one (1) control signal symbol, 24 data symbols and 8 parity symbols. The frame contains a synchronization pattern at its front end for detecting leading bit points of the control signal symbol and a foremost one of each of the data symbols and parity symbols. This frame synchronization pattern is a so-called 11T–11T pattern composed of 11 consecutive channel bits representing "1" and 11 consecutive channel bits representing "0" and following them as shown in FIG. 2, and this frame synchronization pattern is separate from the row of data of the frame. The frame synchronization pattern is detected to produce a frame synchronization signal based on which the number of bits of the frame is counted to detect the control signal symbol and the foremost one of each of the data symbols and parity symbols. Therefore, if a data error develops in the frame due to damage to the disc or the like, and the frame synchronization pattern can not be detected, which is commonly referred to as "dropout", then the data can not be properly reproduced from the disc.

SUMMARY OF THE INVENTION

It is therefore an object of this invention to provide a counter circuit of the type which can produce a count signal in synchronism with a frame of a digital data signal even if a frame synchronization signal is not available, thereby ensuring a frame synchronization.

According to the present invention, there is provided a counter circuit operable in synchronism with a frame of a digital data signal in a digital audio system, the frame being composed of a predetermined number of channel bits, the counter circuit comprising a frame synchronization signal detecting circuit for detecting a frame synchronization signal of the digital data signal to produce a frame synchronization detection signal; a counter for counting reproduction clock pulses reproduced from the digital data signal to produce a count signal when the count of the counter reaches a value corresponding to the predetermined number of channel bits, the reproduction clock pulses corresponding to the channel bits of the frame; and a signal feeding circuit for feeding a reproduction frame synchronization signal to the counter for resetting the counter, the signal feeding circuit being responsive to the frame synchronization detection signal to output the detection signal as the reproduction frame synchronization signal when the count of the counter is within a predetermined range, and the signal feeding circuit being responsive to the count signal to output the count signal as the reproduction frame synchronization signal when the count of the counter is within the predetermined range and when the frame synchronization detection signal is not outputted from the frame synchronization signal detecting circuit.

BRIEF DESCRIPTION OF THE DRAWINGS

FIGS. 5(a), 5(b) and 5(c) are timing charts of the signals P22, wd and VSYNC appearing in the counter circuit of FIG. 4;

FIG. 6 is a detailed block diagram of the lower counter 2 of the counter circuit of FIG. 4.

DESCRIPTION OF THE PREFERRED EMBODIMENT OF THE INVENTION

Figure 1:
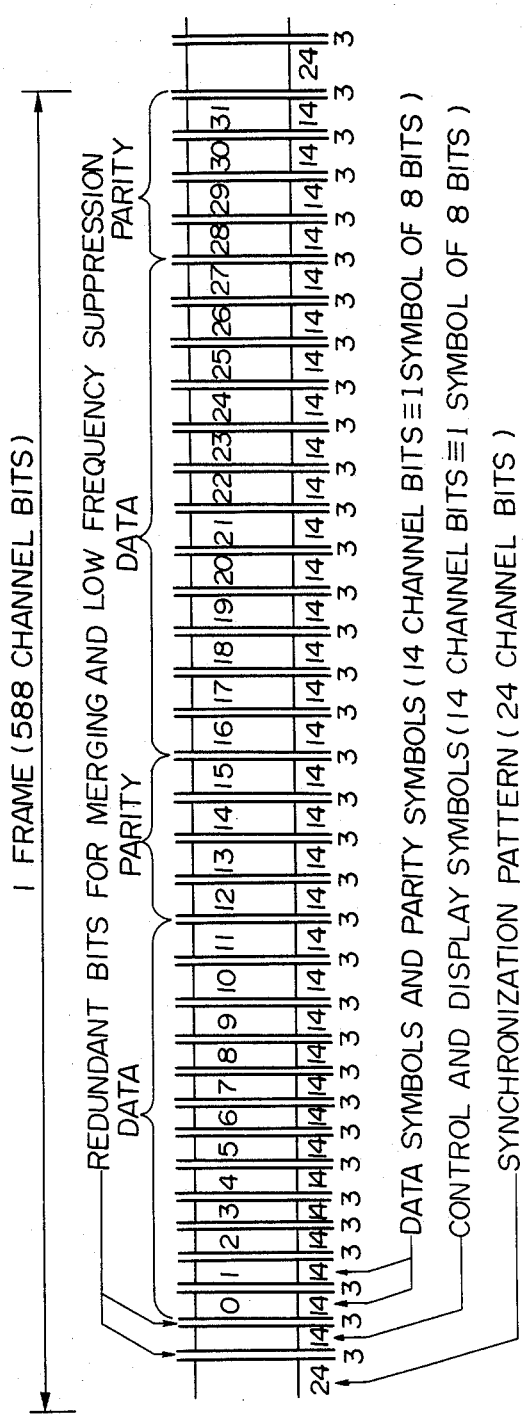
FIG. 1 is an illustration showing one frame of information stored in a compact disc of a compact disc digital audio system.
Figure 2:
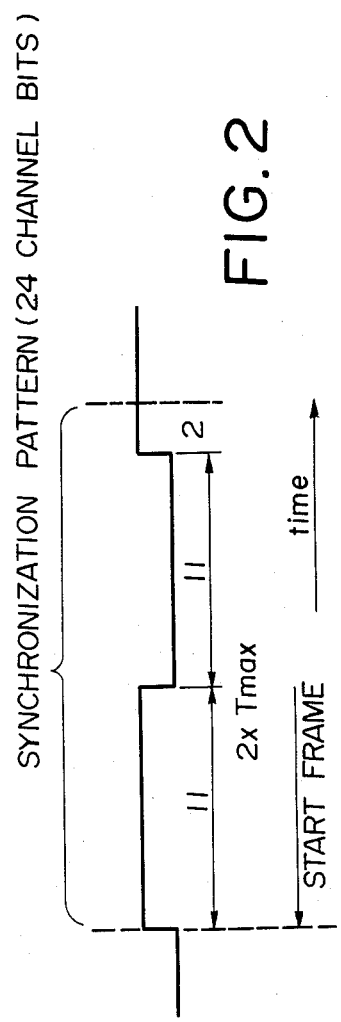
FIG. 2 is an illustration showing a synchronization patterned contained in the frame of FIG. 1.
Figure 3:
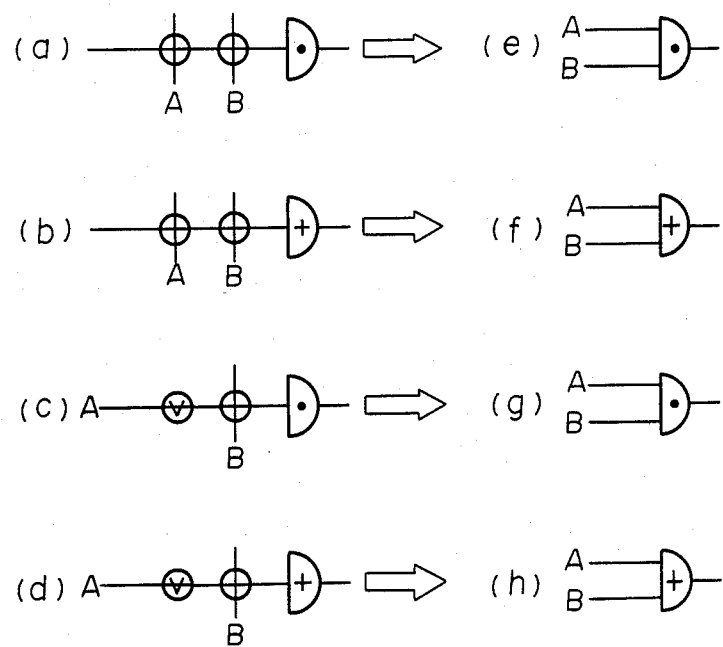
FIG. 3 is an illustration showing logic symbols used in block diagrams of FIGS. 4, 6 and 7.

First, for illustration purposes, logic circuits are shown as simplified in the drawing. More specifically, referring to FIG. 3, symbols indicated by (a) to (d) correspond respectively to those indicated by (e) to (h), respectively.

Figure 4:
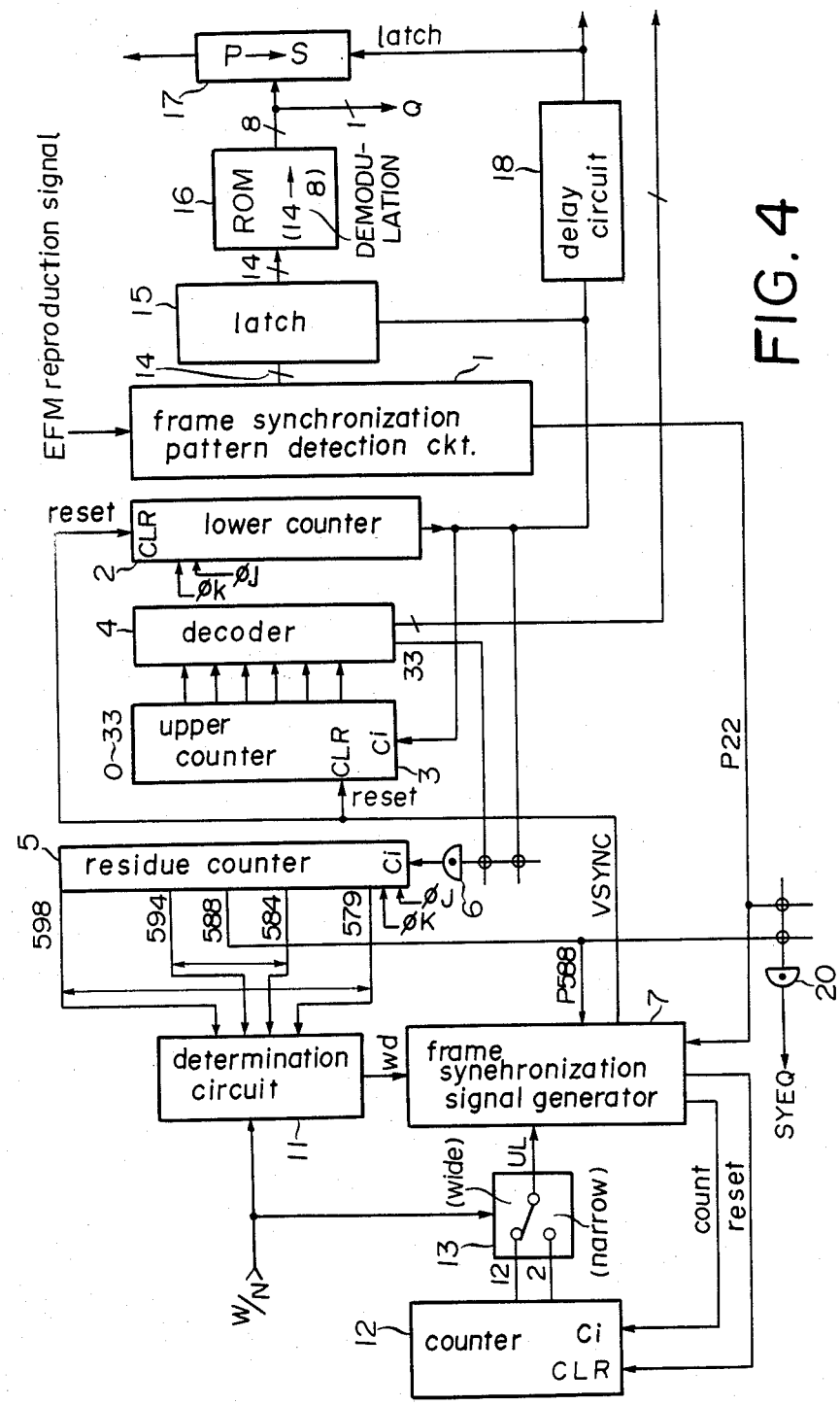
FIG. 4 is a block diagram of a counter circuit provided in accordance with the present invention.

FIG. 4 shows a block diagram of a counter circuit provided in accordance with the present invention, the counter circuit being used in a compact disc player of the compact disc digital audio system. A frame synchronization pattern detection circuit 1 detects a frame synchronization pattern contained in an EFM (eight to fourteen modulation) reproduction signal and having a pattern of 11T—11T and outputs a detection signal P22 representative of this frame synchronization pattern. A lower counter 2 comprises a 17-bit shift register which shifts its input signal from one stage to another in response to reproduction clock pulses $\phi J$, $\phi K$ produced from an EFM signal read from a disc, and the lower counter 2 outputs "1" signal each time seventeen (17) clock pulses are applied thereto. Each of the clock pulses $\phi J$ and $\phi K$ corresponds to 1/588 of one (1) frame of the EFM reproduction signal, and it has a frequency of 4.3218 MHz when the data is reproduced at a predetermined linear speed of the disc since one (1) frame has a time period of 136 usec. The reason why the lower counter 2 is of the 17-bit type is that each symbol in the EFM signal is composed of 14 bits, with three margin bits being provided between two adjacent symbols. Therefore, the lower counter 2 outputs "1" signal in synchronism with the symbol.

An upper counter 3 comprises a 6-bit binary counter and counts up "1" signals fed from the lower counter 2. Therefore, the contents of the upper counter 3 represent the number of the processed symbols of the frame. One (1) frame of the EFM reproduction signal is composed of one (1) control signal symbol, 24 data symbols and 8 parity symbols. Thus, the total of the symbols of one (1) frame is 33. The upper counter 3 is designed to count from 0 to 33. The contents of the upper counter 3 are decoded by a decoder 4.

The lower counter 2 counts 17 clock pulses even after the contents of the upper counter 3 reaches to 33 count, so that the counters 2 and 3 count up to 578 clock pulses [(17×33)+17=578]. A residue counter 5 counts the residual clock pulses of the frame after the lower and upper counters 2 and 3 reach the maximum count 578. The residue counter 5 comprises a 20-bit shift register and is operable in response to the reproduction clock pulses $\phi J$ and $\phi K$ as is the case with the lower counter 2. When the output of the decoder 4 represents "3" and when the lower counter 2 reaches count 17, an AND gate 6 is opened, so that the output of the lower counter 2 representative of "1" is fed to the first stage of the residue counter 5. Then, this output of the lower counter 2 is loaded onto the first stage of the residue counter 5 at the time when the reproduction clock pulses $\phi J$ and $\phi K$ are applied to the residue counter 5. Therefore, the contents of the first stage of the residue counter 5 represents 579 count. The signal "1" inputted into the first stage of the residue counter 5 is shifted sequentially from one stage to another each time the reproduction clock pulses $\phi J$ and $\phi K$ are applied to the residue counter 5.

The frame synchronization detection signal P22 outputted from the frame synchronization pattern detection circuit 1 and a bit output of the residue counter 5 which represents 588 count are adapted to be inputted into a frame synchronization signal generator 7, the bit output of the residue counter 5 being hereinafter referred to as "588 count signal P588". When the frame synchronization detection signal P22 is available and is inputted into the frame synchronization signal generator 7, the generator outputs this frame synchronization detection signal P22 as a reproduction frame synchronization signal VSYNC. On the other hand, if and when the frame synchronization detection signal P22 is not available, the frame synchronization signal generator 7 outputs the 588 count signal P588 as the reproduction frame synchronization signal VSYNC. The reproduction frame synchronization signal VSYNC is used to reset the lower and upper counters 2 and 3 to zero. Therefore, the lower and upper counters 2 and 3 and the residue counter 5 are operated based on the reproduction frame synchronization signal VSYNC, and when the disc is rotated at a predetermined linear speed, the 588 count signal P588 is outputted from the residue counter 5 at the time when the frame synchronization signal VSYNC is outputted from the frame synchronization signal generator 7. Therefore, even if the frame synchronization detection signal P22 is not available, the 588 count signal P588, produced based on the preceding frame synchronization detection signal P22, serves as the reproduced frame synchronization signal VSYNC instead of the frame synchronization detection signal P22 not available at this time.

The frame synchronization signal generator 7 provides for a window WD having a predetermined width of which center corresponds to 588 count of the residue counter 5. When the frame synchronization detection signal P22 is available in the window WD, this frame synchronization detection signal P22 is outputted from the frame synchronization signal generator 7 as the reproduction frame synchronization signal VSYNC as shown in FIG. 5(a). On the other hand, when the frame synchronization detection signal P22 is not available in the window WD, the 588 count signal P588 is outputted from the frame synchronization signal generator 7 as the reproduction frame synchronization signal VSYNC instead of the frame synchronization detection signal P22 as shown in FIG. 5(b). If the several consecutive frame synchronization signals P22 are not available in the window WD, this does not always mean that all of these frame synchronization signals P22 are not available from the EFM reproduction signal, and it is quite possible that the frame synchronization detection signals P22 are displaced out of the windows WD, that is, they are unlocked. As shown in FIG. 5(c), in this case, the frame synchronization signal generator 7 outputs the frame synchronization detection signal P22 as the reproduction frame synchronization signal VSYNC.

In FIG. 4, a determination circuit 11 determines whether the count of the residue counter 5 is within the window WD. When this count is within the window WD, the determination circuit 11 outputs a window signal wd ("1" signal). Depending on the operation of the disc player, the width of the window WD is varied by a window width switching signal W/N in two modes, that is, a wide mode and a narrow mode. In this embodiment, the wide window covers a range of from 579 count to 598 count while the narrow window covers a range of from count 584 to count 594. A counter 12 counts the number of those frames in which the frame synchronization detection signals P22 are not available in the window WD so that the 588 count signals P588 are instead used as the reproduction frame synchronization signals VSYNC, and the counter 12 detects the unlocking of the frame synchronization detection signals P22. When the counter 12 counts a predetermined number of such frames, a switching circuit (decoder) 13 outputs an unlock signal UL to the frame synchronization signal generator 7, so that the generator 7 outputs the frame synchronization detection signal P22 as the reproduction frame synchronization signal VSYNC. When the frame synchronization detection signal P22 is available in the window before the count of the counter 12 reaches the above-mentioned predetermined number, this counter is reset to zero. The predetermined count of the counter 12 which decides the unlocking of the frame synchronization detection signal may be varied depending on the width of the window WD. In this embodiment, when the narrow width of the window WD is selected by the switching circuit 13, 2 count of the counter 12 decides the unlocking of the frame synchronization detection signals. On the other hand, when the wide width of the window WD is set by the switching circuit 13, 12 count decides the unlocking.

As described above, the frame synchronization detection signal P22 produced from the EFM signal is basically used as the reproduction frame synchronization signal VSYNC, and when this frame synchronization detection signal is not available in the window WD, the 588 count signal P588 representative of 588 reproduction clock pulses is used as the reproduction frame synchronization signal VSYNC. And, if the predetermined number of consecutive frame synchronization detection signals P22 are not available in their respective windows WD, it is determined that these signals P22 are unlocked in which case the frame synchronization detection signal P22 is used as the reproduction frame synchronization signal VSYNC. These are shown in the following table.

TABLE

| | wd | |
|---|---|---|
| UL | "0" (P22 out of window WD) | "1" (P22 within window WD) |
| "0" (lock) | P588 (counter 12: count) | P22 (counter 12: reset) |

TABLE-continued

| | wd | |
|---|---|---|
| UL | "0" (P22 out of window WD) | "1" (P22 within window WD) |
| "1" (unlock) | P22 (counter 12: reset) | |

The reproduction frame synchronization signal VSYNC thus obtained is accurately in synchronism with the frame. Therefore, the lower and upper counters 2 and 3 which are reset to zero by the signal VSYNC are also operable accurately in synchronism with the frame of the EFM signal.

The "1" signal, outputted from the lower counter 2 each time it reaches 17 count, is used to process the EFM signal. More specifically, the EFM signal reproduced from the disc is a serial signal, and each time 17 bits of this serial signal are inputted into the frame synchronization pattern detection circuit 1, 14 bits out of these 17 bits are latched by a latch 15, thereby converting the serial signal into a parallel signal, these 14 bits representing the symbol. This parallel signal data is demodulated by ROM 16 in an EFM fashion, and then is converted into serial data by a latch 17 for being fed to an associated circuit (not shown). For the set timing of the latch 17, a delay circuit 18 is provided for delaying the output of the lower counter 2 by a time period required by the ROM for the data demodulation. The decoder 4 outputs a signal representative of the serial number of the symbols of each frame, and therefore this output signal is used as a synchronization signal for other associated circuits.

An AND circuit 20 determines whether the disc is stably rotated at a speed (hereinafter referred to as "synchronization speed") to achieve a predetermined linear speed of the disc. When both the frame synchronization detection signal P22 and the 588 count signal P588 are inputted into the AND circuit 20, the AND circuit 20 outputs a positive synchronization detection signal SYEQ indicating that the disc is rotated stably. On the other hand, when the disc rotation speed deviates from the predetermined synchronization speed, the disc rotation speed is controlled by a disc rotation servo circuit to become closer to the synchronization speed. Thus, in this condition, the disc rotation speed is subjected to variations, so that the period of generation of the frame synchronization detection signal P22 is correspondingly varied. However, the clock pulses OJ and OK are produced based on the preceding data of the EFM signal, and therefore even if the speed of rotation of the disc is varied, the reproduction clock pulses do not reflect such a speed variation immediately. As a result, the time of generation of the frame synchronization detection signal P22 and the time of generation of the 588 count signal P588 do not coincide with each other. For example, when the speed of rotation of the disc is lower than the synchronization speed, the disc is controlled by the servo circuit to rotate at a higher speed, so that the period of generation of the frame synchronization detection signal P22 becomes shorter. As a result, the next frame synchronization detection signal P22 is produced before the 588 count signal P588 is produced. On the other hand, when the disc rotation speed is higher than the synchronization speed, the disc is controlled by the servo circuit to rotate at a lower speed, so that the period of generation of the frame synchronization detection signal P22 becomes longer. As a result, the 588 count signal P588 is produced before the next frame synchronization detection signal P22 is produced. Thus, when the speed of rotation of the disc deviates from the synchronization speed and is subjected to variations, the time of generation of the reproduction synchronization detection signal P22 and the time of generation of the 588 count signal P588 of the residue counter 5 do not coincide with each other, so that the positive frame synchronization signal SYEQ is not outputted from the AND circuit 20. In this manner, whether the disc is rotated stably or not is detected by the presence of the positive frame synchronization signal SYEQ.

The lower counter 2 will now be described in more detail with reference to FIG. 6. As described above, the lower counter 2 comprises a 17-bit shift register 21 which shifts its input signal from one stage to another in response to the reproduction clock pulses $\phi J$ and $\phi K$. The outputs of first to sixteenth stages of the shift register 21 are applied to a NOR circuit 22, and when the contents of the first to sixteenth stages of the shift register 21 are all in the "0" state, the NOR circuit 22 outputs "1" signal. The reproduction frame synchronization signal VSYNC and the output signal of the NOR circuit 22 are applied to an OR circuit 23, and the output signal of the OR circuit 23 is fed to the first stage of the shift register 21. The output of the seventeenth stage of the shift register 21 and the output of the NOR circuit 22 are fed to an AND circuit 24, and the output signal of the AND circuit 24 is fed to the upper counter 3.

With this construction, when the reproduction frame synchronization signal VSYNC ("1" signal) is applied to the lower counter 2, the signal VSYNC is inputted into the first stage of the shift register 21 via the OR circuit 23 and is shifted from one stage to another in response to the reproduction clock pulses $\phi J$ and $\phi K$. When the signal is shifted to the seventeenth stage of the shift register 21, the contents of the first to sixteenth stages of the shift register 21 are all "0" so that the output of the NOR circuit 22 is rendered "1", and therefore the AND circuit 24 outputs a carry signal "1" to the upper counter 3. At this time, the output signal "1" of the NOR circuit 22 is fed to the first stage of the shift register 21 via the OR circuit 23 and is again shifted from one stage to another in response to the reproduction clock pulses $\phi J$ and $\phi K$. Thus, each time the lower counter 2 reaches 17 count, the AND circuit 24 outputs "1" signal to increment the contents of the upper counter 3.

The lower counter 2 shown in FIG. 6 is of such a construction that when "1" signal is inputted into the first stage of the shift register 21 while the contents of any one of the other stages of the shift register 21 is "1", the contents of the one of the other stages representative of "1" is disregarded. More specifically, the reproduction frame synchronization signal VSYNC is produced every 588 channel bits of the EFM signal, and the 588 bits can not be divided by 17. Therefore, when the next reproduction synchronization signal VSYNC is inputted into the first stage of the shift register 21, "1" signal still remains in any one of the other stages. Even if this "1" signal is shifted to the seventeenth stage, the NOR circuit 22 is not turned on so that "1" signal is not outputted from the AND circuit 24, since the next reproduction frame synchronization signal VSYNC has already been inputted into the shift register 21. Therefore, when this reproduction frame synchronization signal VSYNC is shifted into the seventeenth stage, the NOR circuit 22 outputs "1" signal so that the AND circuit 24 outputs "1" signal. At the same time, "1" signal is inputted into the first stage of the shift register 21 via the OR circuit 23 to start again the counting operation of the shift register 21. Thus, the counting operation of the lower counter 2 is always effected in accordance with the reproduction frame synchronization signal VSYNC.

Figure 7:
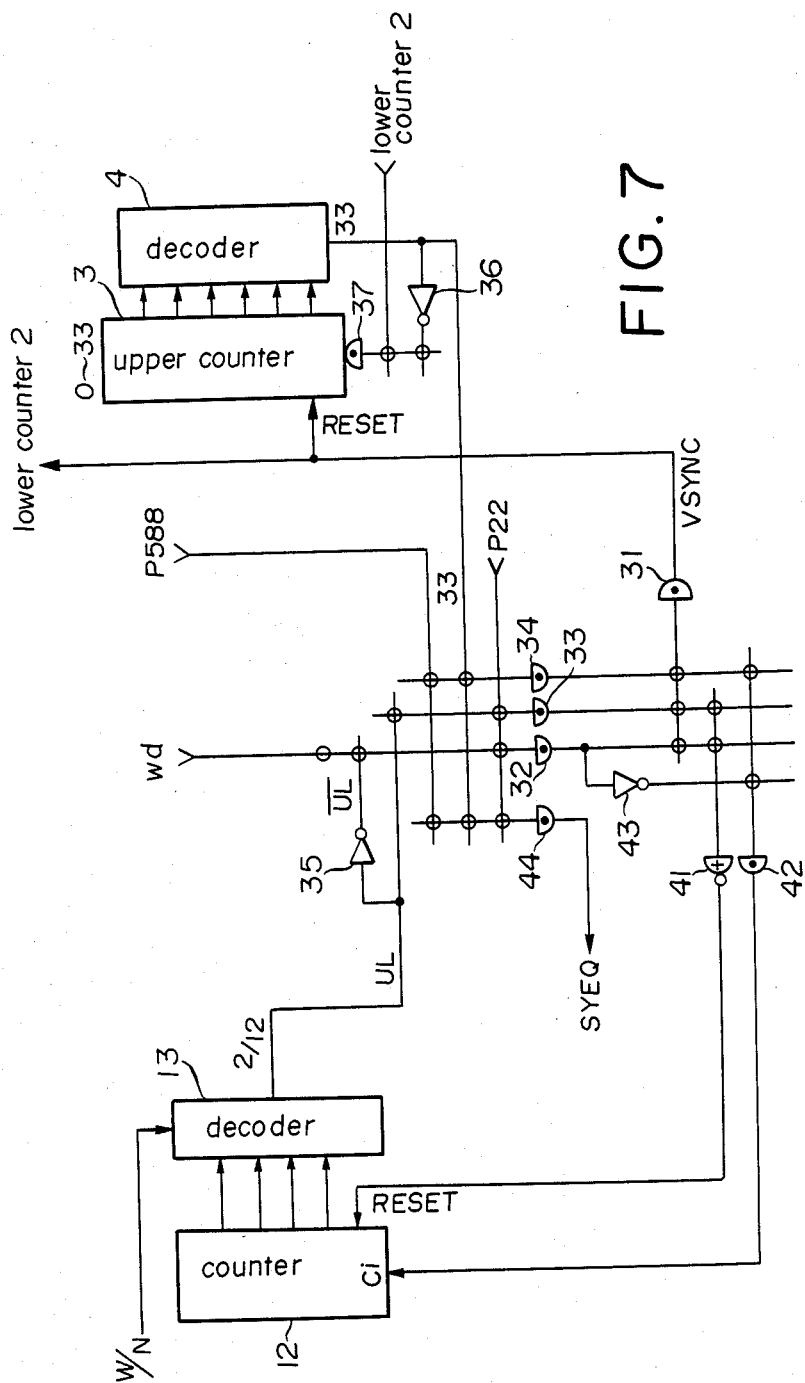
FIG. 7 is a detailed block diagram of the frame synchronization signal generator 7 of the counter circuit of FIG. 4.

The frame synchronization signal generator 7 in FIG. 4 will now be described in more detail with reference to FIG. 7. When the upper counter 3 reaches 33 count, an AND circuit 37 is disenabled via an inverter 36 to stop the counting operation of the upper counter 3, and the count of the upper counter 3 is maintained at 33 until the reproduction frame synchronization signal VSYNC is applied to the upper counter 3. As described above, the counter 12 counts the number of those frames in which the frame synchronization detection signals are subjected to the unlocking. The decoder (switching circuit) 13 decodes the count of the counter 12 and outputs the unlock signal UL ("1" signal) in accordance with the window width switching signal W/N. When the wide width of the window WD is selected, the unlock signal UL represents 12 count of the counter 12. On the other hand, when the narrow width of the window WD is selected, the unlock signal UL represents 2 count of the counter 12.

The reproduction frame synchronization signal VSYNC is outputted from AND circuits 32, 33 and 34 and is fed via an OR circuit 31 to the upper and lower counters 3 and 2 to reset them to zero. The window signal wd indicating that the frame synchronization detection signal P22 is within the window WD, and a signal $\overline{UL}$ produced through the inversion of the unlock signal UL by an inverter 35, and the frame synchronization detection signal P22 are inputted into the AND circuit 32, and when these three signals are all in the "1" state, that is to say, the frame synchronization detection signal P22 is available in the window WD in locked condition, the frame synchronization signal generator 7 outputs this frame synchronization detection signal P22 as the reproduction frame synchronization signal VSYNC. The unlock signal UL and the frame synchronization detection signal P22 are inputted into the AND circuit 33, and when these two signals are both in the "1" state, that is to say, the frame synchronization detection signal P22 is available in an unlocked condition, the AND circuit 33 outputs "1" signal corresponding to this frame synchronization detection signal P22. When the upper counter 3 reaches 33 count and when the 588 count signal P588 is applied to the AND circuit 34, the AND circuit 34 outputs "1" signal corresponding to this 588 count signal P588. The reason why the AND circuit 34 outputs this "1" signal on condition that the count of the upper counter 3 is 33 is that when the 588 count signal P588 is outputted from the residue counter 5 soon after the frame synchronization detection signal P22 is outputted from the frame synchronization signal generator 7 as the reproduction frame synchronization signal VSYNC, this 588 count signal P588 should be prevented from being outputted from the frame synchronization signal generator 7 as the reproduction frame synchronization signal VSYNC. More specifically, when the reproduction frame synchronization signal VSYNC is outputted from the frame synchronization generator 7, the upper and lower counters 3 and 2 are reset to zero by this signal, but the residue counter 5 continues its counting operation. Therefore, it is possible that soon after the frame synchronization detection signal P22 is outputted from the frame synchronization signal generator 7 as the reproduction frame synchronization signal VSYNC, the 588 count signal P588 is also outputted from the signal generator 7 as the reproduction frame synchronization signal VSYNC. For this reason, on condition that the count of the upper counter 3 is 33, the 588 count signal P588 is outputted from the frame synchronization signal generator 7 as the reproduction frame synchronization signal VSYNC, and when the frame synchronization detection signal P22 is outputted from the frame synchronization signal generator 7 as the reproduction frame synchronization signal VSYNC prior to the 588 count signal P588, this reproduction frame synchronization signal VSYNC resets the upper counter 3 to zero and disenables the AND circuit 34, thereby preventing the 588 count signal P588 from being outputted from the frame synchronization signal generator 7 as the reproduction frame synchronization signal VSYNC. On the other hand, when the 588 count signal P588 is outputted from the frame synchronization signal generator 7 as the reproduction frame synchronization signal VSYNC prior to the frame synchronization detection signal P22, this frame synchronization detection signal P22 is also subsequently outputted from the signal generator 7 as the reproduction frame synchronization signal VSYNC. Thus, in this case, two reproduction frame synchronization signals VSYNC are available. However, as described above, when "1" signal is inputted into the first stage of the shift register 21 of the lower counter 2 while the contents of any one of the other stages of the shift register 21 is "1", the contents of the one of the other stages is disregarded. Therefore, the reproduction frame synchronization signal VSYNC representing the 588 count signal P588 and precedingly inputted to the lower counter 2 is disregarded, and the subsequently-inputted reproduction frame synchronization signal VSYNC of the frame synchronization detection signal P22 is utilized. Therefore, the reproduction frame synchronization signal representative of the 588 count signal P588 is utilized only when, in a locked condition (UL="0"), the frame synchronization detection signal P22 is not available in the window WD and when the frame synchronization detection signal P22 is not available at all in an unlocked condition (UL="1").

The output signal of the AND circuit 34 and a signal produced through the inversion of the output signal of the AND circuit 32 by an inverter 43 are fed to an AND circuit 42. When these two signals fed to the AND circuit 42 are both in the "1" state, that is to say, the frame synchronization detection signal P22 is not available in a locked condition (UL="0") in the window WD with the 588 count signal P588 being used as the reproduction frame synchronization signal VSYNC, the AND circuit 42 outputs "1" signal, corresponding to the 588 count signal P588, to the unlock counter 12 to increment the contents of this counter by one (1) count.

The output signals of the AND circuit 32 and 33 are fed to a NOR circuit 41, and when these two signals fed to the NOR circuit 41 are both in the "0" state, that is to say, the frame synchronization detection signal P22 is available in the window WD in an locked condition, or the frame synchronization detection signal P22 is available in an unlocked condition, the NOR circuit 41 outputs "1" signal to the counter 12 to reset it to zero.

When the frame synchronization signal P22 and the 588 count signal P588 are inputted to an AND circuit 44, with the count of the upper counter 3 being 33, the AND circuit 44 outputs the signal SYEQ ("1").

As described above, when the frame synchronization signal of the EFM reproduction signal is not detected, the reproduction clock pulses are counted based on the preceding frame synchronization signal to produce the count signal which substitutes for the frame synchronization signal. Therefore, even if the frame synchronization signal of the EFM reproduction signal is not detected, the counter circuit can always produce a count signal representative of the count in synchronism with the frame.

What is claimed is:

1. A counter circuit operable in synchronism with a frame of a digital data signal in a digital audio system, the frame being composed of a predetermined number of channel bits, said counter circuit comprising:
    (a) frame synchronization detecting means for detecting a frame synchronization signal contained in the digital data signal to produce a frame synchronization detection signal;
    (b) counter means for counting reproduction clock pulses reproduced from the digital data signal to produce a count signal when the count of said counter means reaches a value corresponding to the predetermined number of channel bits, wherein each reproduction clock pulse corresponds to a channel bit of the frame; and
    (c) signal feeding means for feeding a reproduction frame synchronization signal to said counter means for resetting the counter means, said signal feeding means being responsive to said frame synchronization detection signal to output said detection signal as said reproduction frame synchronization signal when the detection signal occurs within a predetermined range of the count of the counter means, and said signal feeding means being responsive to said count signal to output said count signal as said reproduction frame synchronization signal when said frame synchronization detection signal is not outputted from said frame synchronization signal detecting means within said predetermined range.

2. A counter circuit according to claim 1, in which said signal feeding means outputs said frame synchronization detection signal as said reproduction frame synchronization signal when said frame synchronization detection signal is not outputted from said frame synchronization signal detecting means within said predetermined range over a predetermined number of consecutive frames.

3. A counter circuit according to claim 2, in which said predetermined range is selected from a plurality of predetermined ranges of the count of the counter means, each predetermined range having a different width but having the same count of the counter means as its center.

4. A counter circuit according to claim 2, in which said counter means comprises a first counter for counting said reproduction clock pulses to output a first pulse signal each time a predetermined number of said reproduction clock pulses are counted; a second counter for counting said first pulse signal to output a second pulse signal each time a predetermined number of said first pulse signals are counted; and a third counter for counting said first pulse signal after said second counter becomes full count condition, said count signal being outputted from said third counter.

5. A counter circuit according to claim 4, wherein the output of the third counter is applied to the signal feeding means, wherein the signal feeding means determines whether the count of said counter means is within said predetermined range in accordance with the output of said third counter.

6. A counter circuit according to claim 5, in which said first and second counters are reset by said reproduction frame synchronization signal.

7. A counter circuit according to claim 6, in which said first counter comprises a binary shift register composed of a plurality of stages corresponding in number to the maximum count of said first counter, said shift register being so constructed that a "1" signal is enabled to be inputted to the first stage of said plurality of stages when all outputs of the first through penultimate stages of said plurality of stages are "0" and that a "1" signal is enabled to be inputted to the first stage of said plurality of stages when said reproduction frame synchronization signal is outputted from said signal feeding means.

* * * * *